Figure 1:
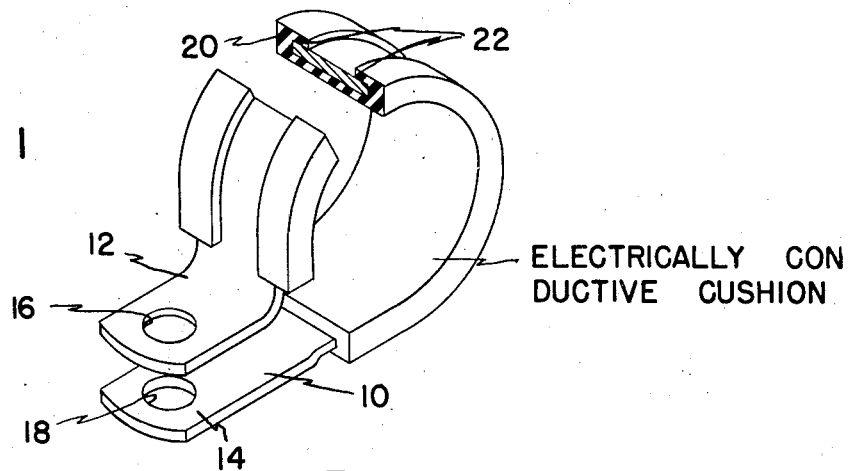

Oct. 5, 1943.  J. W. WHITE ET AL  2,331,098

TUBE CLAMP

Filed Feb. 10, 1942

INVENTOR.
JOHN W. WHITE &
ROBERT R. HARRISON
BY H. W. Brelsford
ATTORNEY

Patented Oct. 5, 1943

2,331,098

UNITED STATES PATENT OFFICE 2,331,098

TUBE CLAMP

John W. White and Robert R. Harrison, North Hollywood, Calif., assignors, by mesne assignments, to Bendix Aviation, Ltd., North Hollywood, Calif., a corporation of California Application February 10, 1942, Serial No. 430,206

6 Claims. (Cl. 174—40)

This invention relates to holders for conduits of the type providing means to electrically ground conduits, and constitutes a continuation in part of a prior filed application, Serial Number 387,210, filed April 7, 1941.

Wherever conduits are used, it is desirable to secure them to a backing or support member so that they will be permanently aligned and positioned. In vehicles particularly, where there is vibration and movement, it is desirable to permanently fasten or secure conduits. These conduits may be of any type, conduits for electrical conductors, conduits for hydraulic lines or fuel lines, or conduits for movable rods or cables. The conduits may be in any type of vehicle, such as a truck, tank, airplane or any other vehicle.

The requirements for airplane use are most stringent, and although our conduit holders are applicable to any type of vehicle, they are designed for use in aircraft and will be described with reference to airplane usage. The first requirement of a conduit holder is that it must securely hold the conduit to the support to which the conduit holder is fastened. There is often intense vibration and elastic structural movement in airplanes and if a plain metal band were used to secure a conduit to a support it would wear and gouge the conduit rendering it unserviceable. This fact has necessitated the cushioning of metal holders or clamps made of metal.

A resilient material is best suited for this purpose so that a constant gripping of the conduit is produced. Rubber is the most satisfactory material, including synthetic rubbers as well as the natural rubber. Since synthetic rubbers are sometimes not called rubber, the term "rubber-like material" will be used in this application to include natural rubber, synthetic rubber and other materials having physical properties similar to rubber.

Conduit holders must be of a safe construction so that the cushioning element will not slip out of the metal band and thereby allow the metal to injure the conduit. A common requirement is that the bond between the metal and the cushion must withstand the effects of oil and gasoline and severe vibration. Thus ordinary natural rubber cemented to a metal backing with ordinary cement could not meet these requirements as both the rubber and the cement would disintegrate under the action of oil and gasoline.

Another requirement of conduit holders for aircraft is that they must be light in weight. This necessitates the use of light weight metal for the holder, and the use of a minimum amount of cushioning material.

A tube or conduit holder for airplanes should also present no fire hazard and should if possible be immune to fire. Thus if cork were used as a cushioning element it would be unsatisfactory because it would burn readily. These fire requirements are important because conduit holders must be used in engine nacelles where high operating temperatures may exist and where fires sometime start.

A tube or conduit holder must also act to ground the conduit to prevent a static potential from building up. As an airplane travels through the air it picks up the static charge of bodies of air or clouds and itself becomes a charged body. Any member which is relatively insulated from the airplane itself may have a different potential as the airplane takes on or loses charges in the surrounding air or clouds. The fact that there is not a perfect flow of static charge even along metals that are good conductors, aggravates this condition. If this potential is great enough the electrons will arc across any intervening non-conductor to eliminate this difference in potential. Such arcing is undesirable as a fire hazard and because it causes radio interference by giving off electromagnetic waves which interfere with radio transmission and reception.

A conduit in an airplane might be grounded at its ends to the airplane, but if it were insulated by rubber cushioned conduit holders along its length the central portion of the conduit might well be at a higher or lower potential than the airplane due to inefficient conduction of static charges. Arcing might then develop and cause trouble. Thus a major requirement of all conduit holders is that they ground the conduit to the airplane or other vehicle to which they are attached. Thus where rubber or another non-conducting material is used as a cushioning element, conducting means must be provided to ground the conduit holder.

It is an object of our invention to provide a light weight conduit holder for use in vehicles, and particularly in aircraft.

Another object is to provide a conduit holder with a cushioning element to prevent injury to the conduit.

Another object is to provide a means of attaching an inexpensive and reliable cushioning element to a metal band to form conduit holders, which cushioning element and its means of attachment will resist the action of gasoline and oil.

Still another object is to provide a cushioned conduit holder which will withstand a substantial amount of heat and fire.

Another object is to provide a conduit holder which can be easily and cheaply made.

Another object is to provide cushioned conduit holders which transmit and equalize static charges between a conduit held by them and the support to which they are fastened.

Still another object is to provide a cushioned conduit holder wherein the cushion itself is electrically conductive to ground any conduit held.

Figure 2:
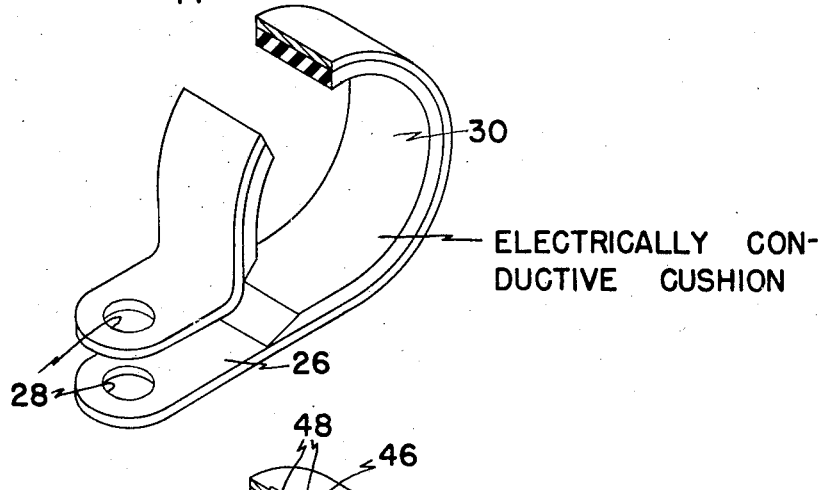
Figure 3:
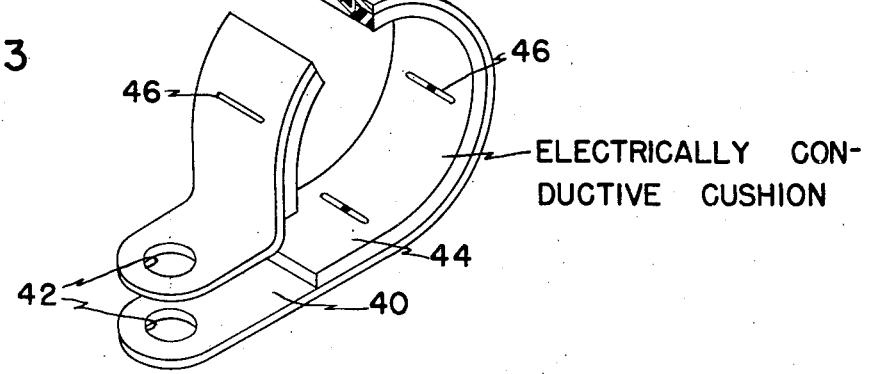

These and other objects and advantages of our invention will appear in the following description and claims which will be better understood when considered in conjunction with the accompanying drawing, in which:

Figure 1 is an isometric view of a conduit holder having a section broken away to show the shape of the rubber cushioning element;

Figure 2 is an isometric view of a conduit holder having a section broken away to show the construction of the cushioning element, which is physically bonded to the metal strip of the conduit holder; and Figure 3 is an isometric view of a conduit holder with a section broken away to show the method of attachment of the cushion element to the metal strap which includes stapling the cushion to the metal.

Referring to Figure 1, a strip of metal 10 is bent in the portions intermediate the ends to define a substantially closed circle. One end 12 is bent at right angles to be parallel with the other end 14 and holes 16 and 18 respectively are formed in these ends through which a screw or bolt may be passed to pull the ends 12 and 14 together and to fasten the strip as a whole to a supporting structure when a conduit is passed therethrough.

Secured to the curved parts of strip 10 is a cushion 20 of rubber-like material. The cushion has a general cross section of a channel shape with inturned edges 22 as shown in the cut away portions of Figure 1. This shape permits the cushion 20 to be snapped on the edges of strip 10. This is preferably done when the strip 10 is flat prior to bending. Cushion 20 may be an extruded shape.

The cushion 20 is an electrical conductor, and although the cushion has been described as made of rubber-like material it may also be made of any cushioning material which would act as an electrical conductor. Conceivably, shredded metals such as aluminum would give the necessary cushioning and conductivity effects. It has been found, however, that by compounding and mixing graphite, lead oxide, or other conductor material with rubber-like materials that the resultant product will conduct electricity. Also, it is believed that certain chemical structures of rubber-like material have resulted in a conductor material. All such materials may be extruded in uncured state and later cured.

The conduit holder of Figure 2 is similar to that of Figure 1 except that the cushion is physically bonded to the metal rather than being "snapped" on as is the cushion 20 of Figure 1. A metal strip 26 bent to the desired shape has holes 28 formed in the ends thereof. An electrically conductive cushion 30 of rubber-like material such as that described above is bonded to the metal strip 26. Since the metal may be aluminum on which it is normally difficult to bond rubber-like materials, the process described in United States Patents 2,147,620 and 2,227,991 is preferably used. This process comprises coating the cleaned metal with a "primer" coating as described in those patents, and applying an uncured sheet of rubber-like conductor material thereto and curing. After curing the cushion is securely bonded to the metal and if lead oxide or other conductor is used in the composition of the primer coating, it also is electrically conductive.

The tube clamp of Figure 3 is similar to that of Figure 2 except that the cushion is stapled to the metal strip rather than bonded thereto. A metal strip 40 bent to the desired shape has holes 42 formed into the ends thereof. Placed on the inner surface of strip 40 is an electrically conductive cushion 44 secured to strip 40 by staples 46. In the broken part of Figure 3 it will be noted that staples 46 have their ends 48 bent inwardly well below the normal inside surface of the cushion 44. This forming of the staples insures that the staples will not touch any conduit held by the tube clamp and thus prevents injury to the conduits. The staples permit a minimum amount of cushion material to be used, as compared to Figure 1, and avoid the difficulties of bonding as used in Figure 2. The staples 46 are preferably of the same metal as the strip 40 to prevent setting up a galvanic action which would promote corrosion. The staples when heat treated may be driven through metal strip 40 with an ordinary machine, and this is preferably done when the strip 40 is flat, prior to bending.

The invention just described dispenses with auxiliary strips of metal commonly used in tube clamps to electrically ground a conduit. The construction is therefore much cheaper and is somewhat lighter. Although the invention has been described with reference to particular embodiments thereof, it is not limited to these embodiments nor otherwise except by the terms of the following claims.

We claim:

1. A tube clamp adapted to secure a tube to a support comprising a loop, and a cushion of electrically conductive material on the inside face thereof to ground a tube held in said clamp.

2. A tube clamp adapted to secure a tube to a support comprising a loop of metal, and a cushion of electrically conductive rubber-like material on its inside face to ground a tube held in said clamp.

3. A tube clamp adapted to secure a tube to a support comprising a loop of metal and a resilient cushion of electrically conductive material secured to the inside of said loop and adapted to elastically grip a tube held by said clamp and to ground the same.

4. A tube clamp adapted to secure a tube to a support comprising a loop of metal, and a cushion of electrically conductive material bonded thereto to cover the inside face of said loop to ground a tube to said loop.

5. A tube clamp adapted to secure a tube to a support comprising a strip formed in a loop, and a cushion of electrically conductive material stapled to said strip to ground a tube to said loop.

6. A tube clamp adapted to secure a tube to a support comprising a loop of metal, and an elastic cushion of electrically conductive material having a cross-sectional shape of a channel with inturned edges, so that the cushion will grip the loop and ground a tube to said loop.

JOHN W. WHITE.
ROBERT R. HARRISON.